Aug. 11, 1936.    A. A. FREY ET AL    2,050,305
PROCESS OF HEAT TREATING STEEL
Filed Oct. 23, 1935
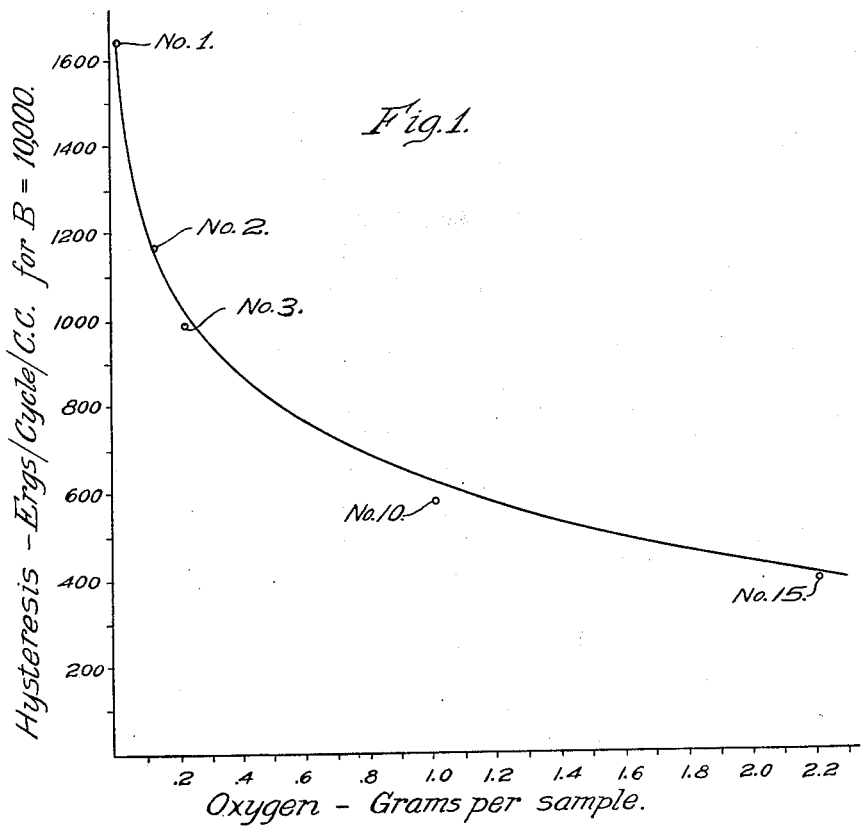
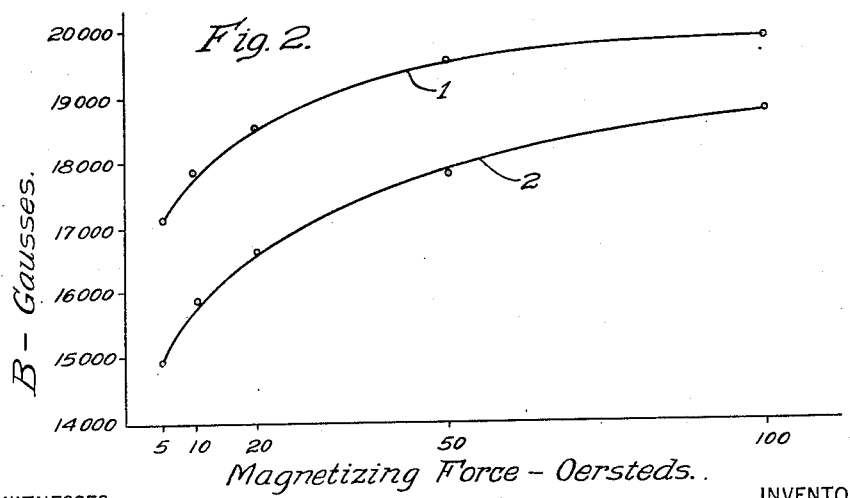
WITNESSES:
INVENTORS
Albert A. Frey and
Stephen L. Burgwin.
BY
ATTORNEY Patented Aug. 11, 1936

2,050,305

UNITED STATES PATENT OFFICE 2,050,305

PROCESS OF HEAT TREATING STEEL

Albert A. Frey and Stephen L. Burgwin, Wilkinsburg, Pa., assignors to Westinghouse Electric & Manufacturing Company, East Pittsburgh, Pa., a corporation of Pennsylvania Application October 23, 1935, Serial No. 46,300

7 Claims. (Cl. 148—14)

This invention relates to a process for heat treating steel, and particularly to an improvement in the process of heat treating steel whereby the impurities of the steel are substantially removed producing a steel having good magnetic products.

Magnetic steel produced by the processes as practiced heretofore contain carbon, phosphorus and sulphur as impurities. These impurities increase the hysteresis losses of the steel. Further, the content of the impurities in the different batches or charges of identical sheets of steel subjected to the same heat treatment vary so that consistent magnetic properties cannot be produced in the different charges.

It is an object of this invention to provide for removing the impurities from silicon steel.

Another object of this invention is to provide a process of heat treating silicon steel in order to produce a magnetic steel having a low impurity content and good magnetic properties.

This invention will be better understood by reference to the following description, when taken in conjunction with the accompanying drawing, in which:

Figure 1 is a graph illustrating the reduction in hysteresis losses in silicon steels when the silicon steels are heat treated in accordance with the teachings of this invention; and Fig. 2 is a graph, the curves of which show the permeability values produced in a silicon steel which has been heat treated in accordance with the teachings of this invention, compared to the permeability values of a similar steel which has been subjected to the heat treatments heretofore employed for developing the magnetic properties.

This invention provides a heat treatment for silicon steel to lower the impurities in the steel and thus lower the hysteresis losses and increase the permeability values. In order to produce the desired result, an iron oxide coating is applied to the silicon steel prior to the final anneal. Upon heating the coated silicon steel sheets in a hydrogen atmosphere, the oxygen of the coating reacts with the carbon contained in the steel and which is normally diffused to the surface of the steel during the heating, and the reaction product is carried off by the hydrogen gas. This treatment is of particular value when employed as the final step in the heat treatment of a steel having a preferred orientation of the crystals.

In the preferred process, iron oxide in the form of a paint is applied to silicon steel sheets which have been rolled to give a preferred orientation to the crystals. The iron oxide paint may be applied to the silicon steel sheets by brushing, spraying or dipping.

The paint may be prepared by grinding iron oxide ($Fe_2O_3$), in a ball mill and mixing it with water, alcohol or any other suitable liquid. A sufficient amount of the iron oxide to give a paint-like consistency will be utilized.

In order to prevent the sheets from sticking together, they are further coated with a refractory material such as aluminum oxide ($Al_2O_3$). The oxide coatings may be applied to the surfaces as separate coatings or as a single coating of a paint comprising an intimate mixture of the iron oxide and aluminum oxide.

After the sheets are thoroughly coated and dried, they are stacked in a suitable furnace in a hydrogen atmosphere. The temperature of the furnace is slowly raised to an annealing temperature of between 900° C. and 1300° C. After being subjected to the annealing temperature for a period of time, the annealed sheets are slowly cooled in the furnace in the hydrogen gas to room temperature.

As illustrated in the drawing and particularly in Fig. 1 thereof, the hysteresis losses encountered in steels treated in accordance with the teachings of this invention are related to the amount of oxygen contained in the coating applied to the surface of the steel. Fig. 1 illustrates the hysteresis losses encountered in sheets of 3¼% silicon steel to which coatings of paint comprising iron oxide and aluminum oxide in the proportions set forth in the following table have been applied and which have been annealed at a temperature of 1100° C. for a period of 10 hours.

| Paint | $Al_2O_3$ | $Fe_2O_3$ |
|---|---|---|
|  | Percent | Percent |
| No. 1 | 99 | 1 |
| No. 2 | 98 | 2 |
| No. 3 | 97 | 3 |
| No. 5 | 95 | 5 |
| No. 7 | 93 | 7 |
| No. 10 | 90 | 10 |
| No. 15 | 85 | 15 |

As illustrated in Fig. 1, the hysteresis losses, as shown by the ordinate in ergs per cycle per c. c. for B equals 10,000, are lowered in accordance with the oxygen content of the paint as calculated from the composition of the paint. As viewed in the drawing, the hysteresis loss for a 3¼% silicon steel is lowered from above 1600 ergs per cycle per c. c. when coated with paint No. 1 comprising 1% iron oxide and 99% aluminum oxide to about 400 ergs per cycle per c. c. when coated with paint No. 15 comprising 15% iron oxide and 85% aluminum oxide. The hysteresis losses encountered by steels which are coated with paints comprising the different compositions hereinbefore set forth are also shown in the drawing.

The permeability of silicon steels which have been heat treated in accordance with the teachings of this invention is illustrated by curve I of Fig. 2 of the drawing. Curve I illustrates the permeability at different magnetizing forces of a 3¼% silicon steel which has been produced by the heat treatment of this invention while curve 2 illustrates the permeability at the same magnetizing forces of a similar sheet of 3¼% silicon steel which has been produced by the same heat treatment, except for the omission of the coating of the sheets with the iron oxide paint prior to the final anneal.

By analysis, it is found that the carbon content of the steel which has been heat treated in accordance with the teachings of this invention is less than .004%. Further, it is also found that other impurities such as phosphorus and sulphur have been removed.

As a possible explanation as to why this invention produces such a superior steel, the following is offered. Before the annealing temperature at which the coated and stacked silicon sheets are annealed is reached, the pure hydrogen of the atmosphere surrounding the sheets starts to react with the iron oxide coating on the surfaces of the sheets to produce water vapor. From the experiments conducted, it is evident that this reaction begins at about 700° C. The resulting water vapor oxidizes the surfaces of the silicon steel sheets. As the temperature of the furnace approaches the annealing temperature, the carbon content of the silicon steel sheets tends to diffuse to the surfaces of the sheets where it reacts with the oxygen formed by the oxidation of the surfaces and forms carbon oxides such as carbon monoxide and carbon dioxide. The reaction products of the carbon and oxygen are then carried away from the steel by the flow of the hydrogen gas in the furnace. Such reaction continues until all of the oxygen is utilized and the steel is decarbonized. The termination of this reaction has been found to be at a temperature below the final annealing temperature.

By coating each of the sheets with the iron oxide paint and then annealing the coated silicon steel sheets, it will be evident that a magnetic steel will be produced which will have an extremely low carbon content and good magnetic properties. It will also be evident that since each batch or charge of silicon steel sheets is oxidized and annealed in a similar manner consistent magnetic properties will be secured from each charge. Thus, this invention overcomes the difficulties encountered in the processes heretofore employed. This invention further produces a very clean and bright steel.

Although this invention has been described with reference to a particular embodiment thereof, it is desired that it be not limited thereto except insofar as is necessitated by the prior art and the scope of the appended claims.

We claim as our invention:

1. In the process of heat treating silicon steel, in combination, coating the silicon steel with iron oxide, heating the coated silicon steel in hydrogen atmosphere at a temperature below 900° C. to oxidize it, heating the oxidized silicon steel in hydrogen at a temperature above 900° C. to anneal it, and cooling the oxidized and annealed material.

2. In the process of heat treating silicon steel, in combination, coating the silicon steel with iron oxide, heating the coated silicon steel in a hydrogen atmosphere at a temperature below the annealing temperature to oxidize it, heating the oxidized silicon steel in hydrogen at a temperature between 900° C. and 1300° C. to anneal it, and cooling the oxidized and annealed material.

3. In the process of heat treating silicon steel, in combination, coating the silicon steel with an iron oxide paint, heating the iron oxide coated silicon steel in a hydrogen atmosphere below 900° C. to oxidize it, heating the oxidized steel in hydrogen at a temperature above 900° C. to anneal it, and cooling the oxidized and annealed material.

4. In the process of heat treating silicon steel, in combination, coating the silicon steel with a paint comprising an iron oxide and aluminum oxide, heating the coated silicon steel in hydrogen at a temperature below 900° C. to oxidize it, heating the steel in hydrogen at a temperature between 900° C. and 1300° C. to anneal it, and cooling the oxidized and annealed material in the hydrogen atmosphere.

5. In the process of heat treating sheets of silicon steel, in combination, coating the silicon steel sheets with a paint comprising an iron oxide, heating the coated silicon steel sheets in hydrogen at a temperature sufficient for the iron oxide to react with the hydrogen to oxidize the surface of the silicon steel sheets, continuing the heating at a higher temperature but below annealing temperature to decarbonize the silicon steel, raising the temperature and annealing the decarbonized silicon steel in the hydrogen atmosphere at a temperature between 900° C. and 1300° C.

6. In the process of heat treating sheets of silicon steel, in combination, coating the silicon steel sheets with a paint comprising an iron oxide and aluminum oxide, heating the coated silicon steel sheets in hydrogen at a temperature sufficient for the iron oxide to react with the hydrogen to oxidize the surface of the silicon steel sheets while the aluminum oxide prevents the welding of the sheets, continuing the heating at a higher temperature but below annealing temperature to decarbonize the silicon steel, raising the temperature and annealing the decarbonized silicon steel in hydrogen at a temperature between 900° C. and 1300° C.

7. In the process of heat treating sheets of silicon steel, in combination, coating the silicon steel sheets with a paint comprising iron oxide, heating the coated silicon steel sheets in hydrogen at a temperature sufficient for the iron oxide to react with the hydrogen to oxidize the surface of the silicon steel sheets, continuing the heating at a higher temperature but below annealing temperature to diffuse the carbon of the steel to its surface whereby the carbon and oxygen react to produce carbon oxides, the carbon oxides being dispersed by the hydrogen, annealing the decarbonized silicon steel in hydrogen at a temperature between 900° C. and 1300° C. and cooling the decarbonized and annealed steel in hydrogen to room temperature.

ALBERT A. FREY.
STEPHEN L. BURGWIN.